(12) United States Patent
Cameron et al.

(10) Patent No.: US 8,274,521 B2
(45) Date of Patent: Sep. 25, 2012

(54) SYSTEM AVAILABLE CACHE COLOR MAP

(75) Inventors: George R. Cameron, Santa Cruz, CA (US); Blake A. Jones, Oakland, CA (US); Kit M. Chow, Carlsbad, CA (US)

(73) Assignee: Oracle America, Inc., Redwood City, CA (US)

( * ) Notice: Subject to any disclaimer, the term of this patent is extended or adjusted under 35 U.S.C. 154(b) by 810 days.

(21) Appl. No.: 12/437,626

(22) Filed: May 8, 2009

(65) Prior Publication Data

US 2010/0283793 A1  Nov. 11, 2010

(51) Int. Cl.
G09G 5/36 (2006.01)
(52) U.S. Cl. ........ 345/557; 345/549; 345/564; 345/570; 711/118; 711/133; 711/159
(58) Field of Classification Search .............. 345/549, 345/557, 561–574; 711/133–136, 159–160, 711/203–209
See application file for complete search history.

(56) References Cited

U.S. PATENT DOCUMENTS

| 6,370,622 | B1 * | 4/2002 | Chiou et al. | 711/146 |
| 6,654,859 | B2 * | 11/2003 | Wooldridge | 711/147 |
| 7,895,392 | B2 * | 2/2011 | Shen et al. | 711/113 |

OTHER PUBLICATIONS

Liedtke, Jochen, "Colorable Memory", IBM T. J. Watson Research Center, Nov. 10, 1996 (4 pages).

* cited by examiner

*Primary Examiner* — Xiao M. Wu
*Assistant Examiner* — Charles Tseng
(74) *Attorney, Agent, or Firm* — Osha Liang LLP

(57) ABSTRACT

A method involving receiving an indication of a requirement to allocate at least one page for a process, where pages are associated with cache colors; generating a selection bitmap by performing a logical operation of a system available colors bitmap and a process bitmap, where the system available colors bitmap and the process bitmap each include one bit corresponding to each cache color, where each bit of the system available colors bitmap indicates whether a number of pages associated with a corresponding cache color that are available to be allocated is above a minimum threshold, and where each bit of the process bitmap indicates whether any pages associated with the corresponding cache color have been recently allocated for the process. The method also includes selecting, using the selection bitmap, a cache color; and allocating a page for the process, wherein the allocated page is associated with the selected cache color.

20 Claims, 6 Drawing Sheets

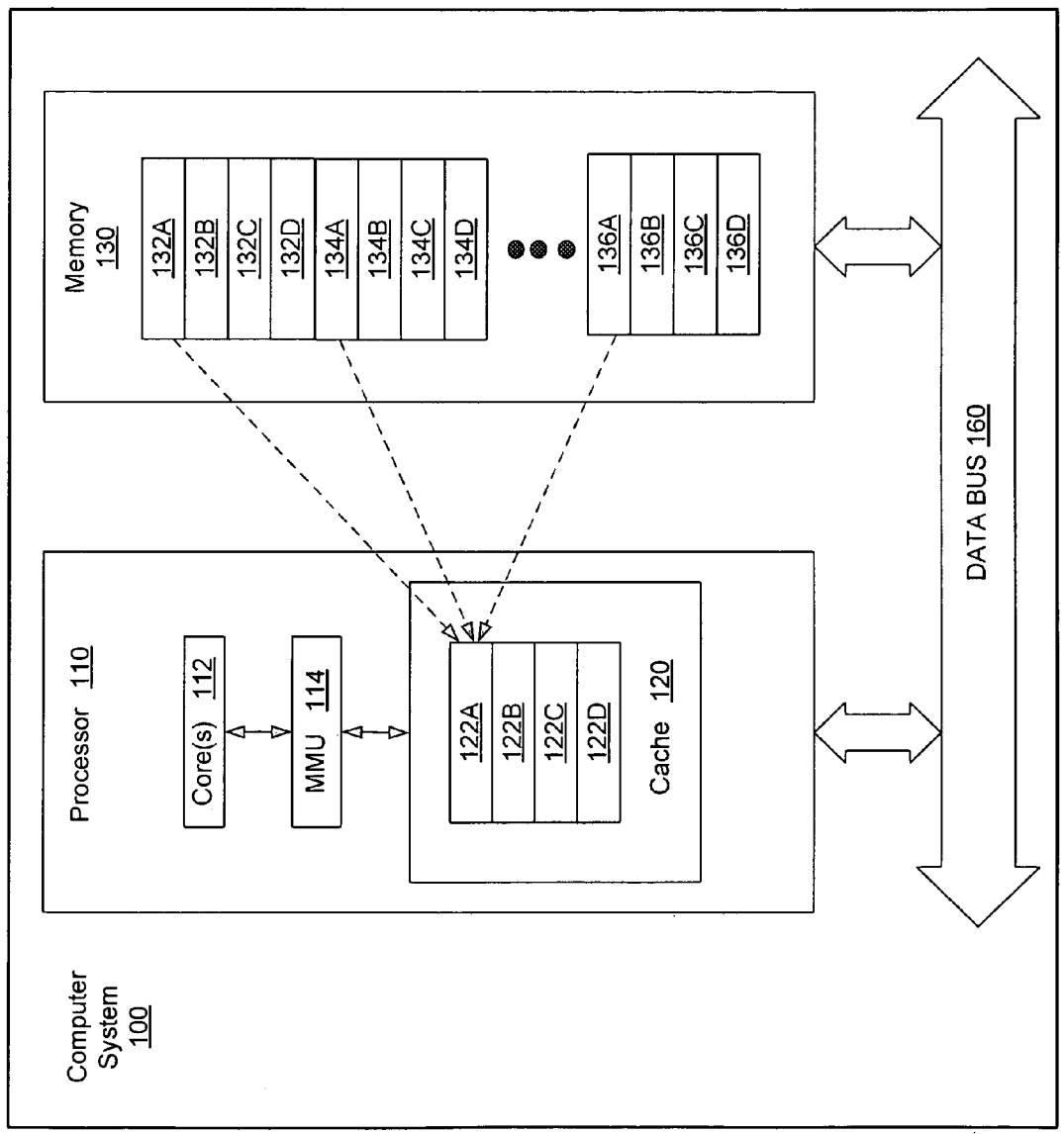

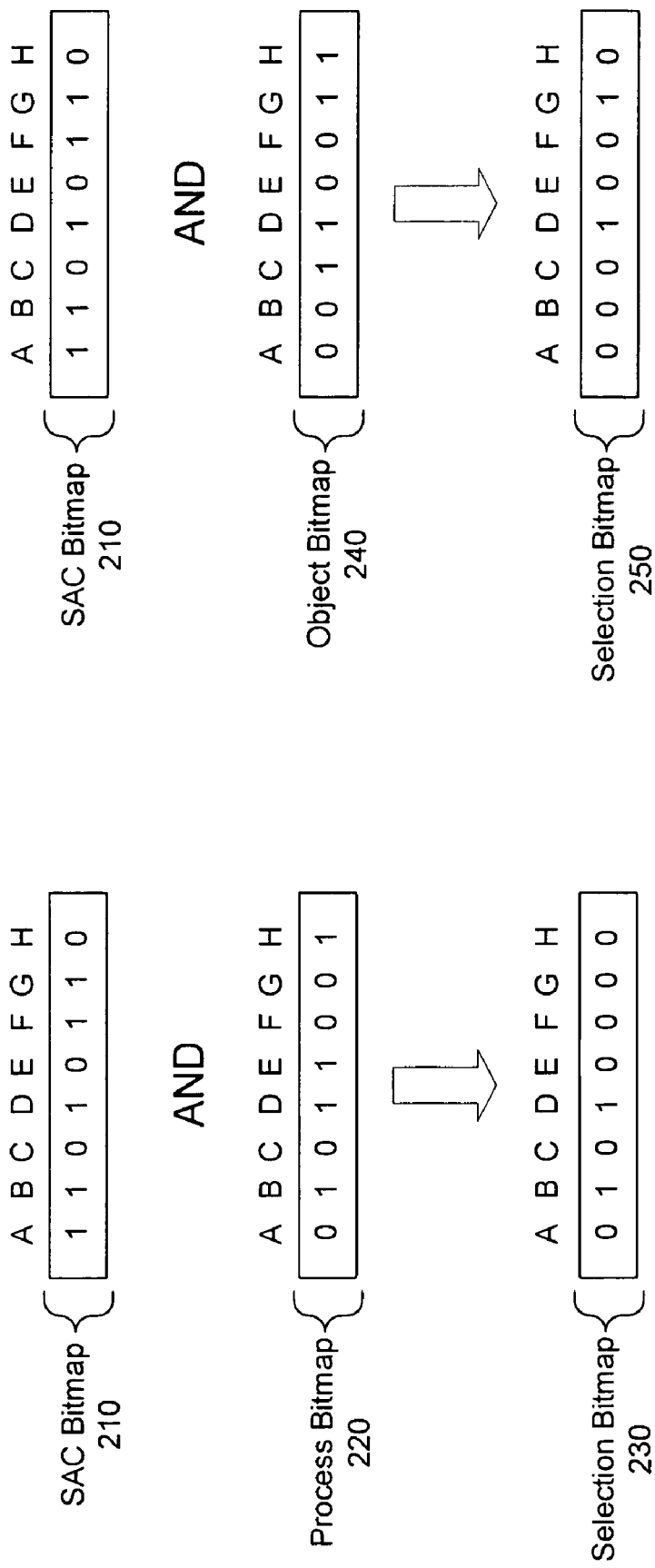

SYSTEM AVAILABLE CACHE COLOR MAP

BACKGROUND

The functions of a computer system are achieved by a processor executing instructions. Both the instructions and the data used in the execution of the instructions are stored in memory on the computer system. Accordingly, in order to execute the instructions, the processor must first obtain the instructions and the data from memory. In a typical computer system, memory is divided into various components. For example, the memory components may include a cache, main memory, and secondary storage. Generally, the cache stores less data and is faster than the other memory components.

Some computer systems use caches which are indexed by the physical address of the piece of memory to be stored in the cache. Because caches are typically smaller than physical memory, a given cache location may store data from one of several different addresses in physical memory. As such, all addresses of physical memory from which data may be stored in a given cache location may be referred to as having the same "cache color."

SUMMARY

In general, in one aspect, the invention relates to a method for allocating at least one of a plurality of pages of a physical memory in a computer, including receiving an indication of a requirement to allocate the at least one page of the plurality of pages for a process, where the plurality of pages are associated with a plurality of cache colors; generating a selection bitmap by performing a logical operation of a system available colors bitmap and a process bitmap, where the system available colors bitmap and the process bitmap each include one bit corresponding to each of the plurality of cache colors, where each bit of the system available colors bitmap indicates whether a number of pages associated with a corresponding cache color that are available to be allocated is above a minimum threshold, and where each bit of the process bitmap indicates whether any pages associated with the corresponding cache color have been recently allocated for the process. The method also includes selecting, using the selection bitmap, a cache color of the plurality of cache colors; and allocating a page of the plurality of pages for the process, where the allocated page is associated with the selected cache color.

In general, in one aspect, the invention relates to a computer readable storage medium having computer readable program code embodied therein. The computer readable program code is adapted to, when executed by a processor, implement a method for allocating at least one of a plurality of pages of a physical memory, the method including receiving an indication of a requirement to allocate the at least one page of the plurality of pages to store a data object, where the plurality of pages are associated with a plurality of cache colors; generating a selection bitmap by performing a logical operation of a system available colors bitmap and an object bitmap, where the system available colors bitmap and the object bitmap each include one bit corresponding to each of the plurality of cache colors, where each bit of the system available colors bitmap indicates whether a number of pages associated with a corresponding cache color that are available to be allocated is above a minimum threshold, and where each bit of the object bitmap indicates whether any pages associated with the corresponding cache color have been recently allocated to store the data object. The method also includes selecting, using the selection bitmap, a cache color of the plurality of cache colors; and allocating a page of the plurality of pages to store the data object, wherein the allocated page is associated with the selected cache color.

In general, in one aspect, the invention relates to a system, including: a processor; a physical memory; and a computer usable storage medium having computer readable program code embodied therein, the computer readable program code adapted to, when executed by the processor, implement a method for allocating at least one of a plurality of pages of the physical memory. The method includes receiving an indication of a requirement to allocate the at least one page of the plurality of pages to store a data object required by a process, where the plurality of pages are associated with a plurality of cache colors; and determining whether an object bitmap corresponding to the data object exists. The method also includes, upon determining that the object bitmap corresponding to the data object exists: generating a selection bitmap by performing a logical operation of a system available colors bitmap and the object bitmap, where the system available colors bitmap and the object bitmap each include one bit corresponding to each of the plurality of cache colors, where each bit of the system available colors bitmap indicates whether a number of pages associated with a corresponding cache color that are available to be allocated is above a minimum threshold, and where each bit of the object bitmap indicates whether any pages associated with the corresponding cache color have been recently allocated to store the data object. The method also includes selecting, using the selection bitmap, a cache color of the plurality of cache colors; and allocating a page of the plurality of pages to store the data object, wherein the allocated page is associated with the selected cache color.

Other aspects of the invention will be apparent from the following description and the appended claims.

BRIEF DESCRIPTION OF DRAWINGS

FIGS. 1A-1B show a computer system in accordance with one or more embodiments of the invention.

FIGS. 2A-2B show exemplary data structures for allocating memory pages based on cache color, in accordance with one or more embodiments of the invention.

DETAILED DESCRIPTION

Figure 1B:
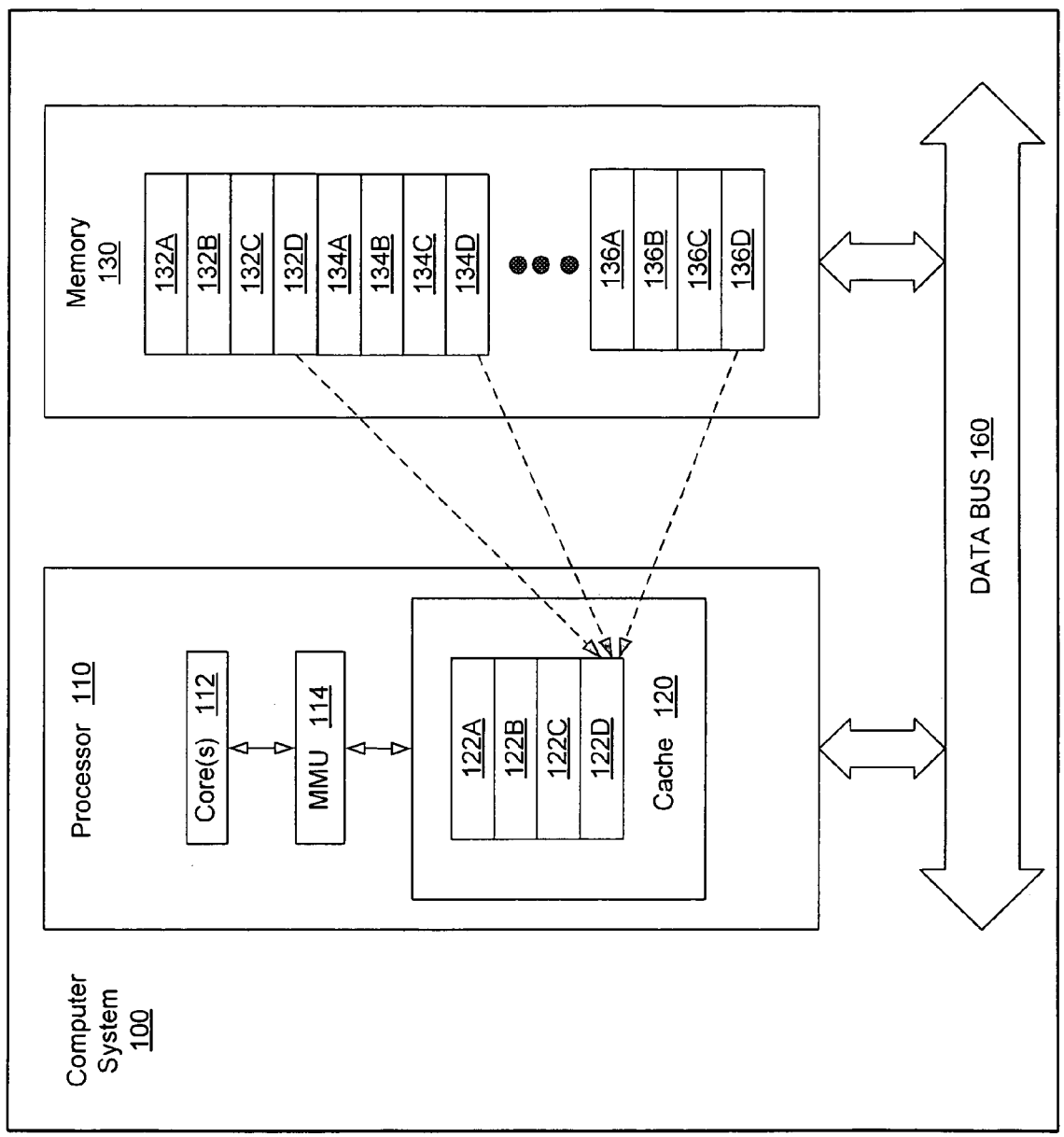

Specific embodiments of the invention will now be described in detail with reference to the accompanying Figs. Like elements in the various Figs. are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for using computer memory. More specifically, embodiments of the invention relate to a method and system for allocating memory pages of physical memory based on their cache colors (i.e., based on their associated cache pages). By allocating memory pages across multiple cache colors, the performance of a computer system may be improved.

FIGS. 1A-1B show a computer system (100) in accordance with one or more embodiments of the invention. As shown in FIG. 1A, the computer system (100) may include a processor (110) operatively connected to a memory (130) by a data bus (160). The memory (130) may be any physical memory such as random access memory (RAM), flash memory, hard disk, an optical drive such as a compact disk drive or digital video disk (DVD) drive, a flash memory stick, or any other type of physical storage device.

In one or more embodiments, the processor (110) may include a core(s) (112), a memory management unit (MMU) (114), and a cache (120). The core(s) (112) may be a logical hardware device that includes functionality to process program instructions. In one or more embodiments, the core(s) (112) may be configured to carry out a computing processes in virtual memory, meaning a contiguous address space which is mapped to the physical address space of the memory (130). The MMU (114) may be configured to translate any requests for data from the core(s) (112) from a virtual memory address to a physical memory address. The requests may be satisfied by the cache (120). If the requested data is not included in the cache (120), the requested data may be retrieved from the memory (130) and then copied into the cache (120). The cache (120) may include multiple lines which store data from corresponding pages of the memory (130). Those skilled in the art will appreciate that a given cache line in the cache (120) may stored only a portion of data from the corresponding pages of the memory (130) at any given time due to size difference between a cache line and the corresponding pages of memory (130).

For example, assume the core(s) (112) sends a request to access a data object stored at a particular virtual memory address. The request is sent to the MMU (114), which translates the request from the virtual memory address to a corresponding physical memory address (e.g., memory page (132A) shown in FIG. 1A). In one or more embodiments, each physical page of the memory (130) may be associated with one of the lines of the cache (120). In this example, as indicated in FIG. 1A by a dotted arrow, the physical page (132A) is associated with the cache line (122A). Accordingly, an attempt is first made to satisfy the request by reading from the cache line (122A). However, if the requested data is not satisfied by the cache line (122A) (i.e., the requested data is not currently stored in cache line), then the request is satisfied by reading the requested data from the associated physical page (132A) and then copying the requested data into the cache (120).

Referring again to FIG. 1A, in one or more embodiments, the pages of the memory (130) may be associated to each cache line in numerical order (i.e., from a first cache line to a last cache line). After a different memory page has been assigned to each cache line, another set of memory pages is associated to the cache lines. Such associations may continue in rotating fashion, until each memory page has been associated with a cache line. For example, as shown in FIG. 1A, the cache (120) may include four lines, namely cache line (122A), cache line (122B), cache line (122C), and cache line (122D). Assume that the first page of memory (130) (i.e., memory page (132A)) is associated with the first cache line (i.e., cache line (122A)), that the second page of memory (130) (i.e., memory page (132B)) is associated with the second cache line (i.e., cache line (122B)), and so forth. Note that, after the first four memory pages (i.e., memory pages (132A)-(132D)) are associated with the four cache lines (i.e., cache lines (122A)-(122D)), the next four memory pages (i.e., memory pages (134A)-(134D)) are also associated to the four cache lines in turn. Accordingly, as shown by dotted arrows in FIG. 1A, starting with the first memory page, every fourth memory page, (i.e., memory pages (132A), (134A), (136A), etc.) is associated with the first cache line (i.e., cache line (122A)). Similarly, as shown by dotted arrows in FIG. 1B, starting with the fourth memory page, every fourth memory page, (i.e., memory pages (132D), (134D), (136D), etc.) is associated with the fourth cache line (i.e., cache line (122D)).

In one or more embodiments, the memory pages associated to a given cache line may be described as sharing the same cache color. In other words, all memory pages sharing the same cache color will be cached in the same line of the cache (120). For example, referring to FIGS. 1A-1B, the memory pages associated with cache line (122A) may be described as having cache color "A," the memory pages associated with cache line (122B) may be described as having cache color "B," and so forth.

One of skill in the art should appreciate that the cache (120) may represent one or more levels of cache (i.e., L1, L2, L3, etc.) included in the processor (110). In particular, the cache (120) may represents any cache that is indexed to physical memory. Further, one of skill in the art will recognize that the example shown in FIGS. 1A-1B is simplified for the sake of illustration, and is not intended to be limiting of the invention. For example, the cache (120) may include more than four cache lines. In another example, the cache (120) may be set associative, meaning each memory page may be associated to a set of cache pages rather than a single cache page.

In one or more embodiments, data may be stored in memory pages according to their cache colors. Generally, if a given process is predominately allocated using memory pages of the same cache color, the data objects required by that process may tend to occupy the same cache page. As such, the various data objects used by that process may tend to displace each other in the cache (120), thus requiring that the displaced data objects be retrieved from the memory (130) and stored in the cache (120), thereby displacing other data from the cache (120). Similarly, such displacement of required data may also occur when a shared data object (e.g., a shared library such as libc, etc.) is predominately allocated using memory pages of the same cache color. Generally, retrieving of data objects from memory (130) is slower than retrieving the same data objects from the cache (120), and may thus impair the performance of the computer system. Accordingly, allocating process data and/or shared objects across memory pages of different cache colors may reduce displacement of required data, and may thus result in improved performance of the computer system.

FIGS. 2A-2B show exemplary data structures for allocating memory pages based on cache color, in accordance with one or more embodiments of the invention. In particular, FIG. 2A shows a system available colors (SAC) bitmap (210), a process bitmap (220), and a selection bitmap (230). In one or more embodiments, the SAC bitmap (210), the process bitmap (220), and the selection bitmap (230) may each include a binary bit (i.e., 1 or 0) for each cache color of a cache (e.g., cache (120) shown in FIGS. 1A-1B). For instance, in the example shown in FIG. 2A, the SAC bitmap (210), the process bitmap (220), and the selection bitmap (230) each include eight bits, labeled "A" to "H." Accordingly, the SAC bitmap (210), the process bitmap (220), and the selection bitmap (230) shown in FIG. 2A may each correspond to a cache having eight cache colors (where each cache color may be associated with one or more cache pages).

In one or more embodiments, each bit of the SAC bitmap (210) may indicate whether the number of memory pages of a corresponding cache color that are available (i.e., not already allocated) is above a minimum threshold. For example, assuming a minimum threshold of three pages, if the number of available pages of cache color "A" is five, then the bit in the SAC bitmap (210) which corresponds to cache color "A" may be set to "1," thereby indicating that the available number of pages is above the minimum threshold. In another example, assuming the number of available pages of cache color "B" is one, then the bit in the SAC bitmap (210) which corresponds to cache color "B" may be set to "0." In one or more embodiments, a single SAC bitmap (210) may represent all of the pages in the memory (130). Alternatively, multiple SAC bitmaps (210) may be used to represent different levels or groups of memory pages (e.g., a section of the memory).

In one or more embodiments, each process executing on the computer system (100) may have a corresponding process bitmap (220). Within a particular process bitmap (220), each bit may indicate whether any memory pages of a particular cache color have not been recently allocated for use by the process to which the process bitmap (220) corresponds. Initially, all the bits of the process bitmap (220) may be set to "1." Thereafter, as memory pages of various cache colors are allocated for the process, the bits corresponding to those cache colors may be set to "0." For example, in the process bitmap (220) shown in FIG. 2A, the bit for cache color "A" is set to "0," thus indicating that one or more memory pages of cache color "A" have been recently allocated for the process corresponding to the process bitmap (220). Further, the bit for cache color "B" is set to "1," thus indicating that no memory pages of cache color "B" have been recently allocated for the process corresponding to the process bitmap (220).

In one embodiment, once a memory page is allocated, the corresponding bit in the process bitmap may remain set to "0" until such time that the number of bits in the process bitmap (220) that are set to "0" exceeds some defined threshold (e.g., if all bits are set to "0," if 90% of the bits are set to "0," etc.). Once the number of bits set to "0" exceeds the defined threshold, all the bits of the process bitmap (220) may be reset to "1." In another embodiment, once a memory page of a given cache color is allocated, the corresponding bit may remain set to "0" until a specified period (e.g., ten minutes, ten cycles, etc.) has elapsed. After the specified period has elapsed, that individual bit may be reset to "1."

In one or more embodiments, the selection bitmap (230) may be generated by performing a logical operation using the SAC bitmap (210) and the process bitmap (220). Specifically, referring again to FIG. 2A, in one or more embodiments, the selection bitmap (230) may be generated by performing a logical AND of each bit in the SAC bitmap (210) with a corresponding bit (i.e., a bit representing the same cache color) of the process bitmap (220). In other words, a bit of the selection bitmap (230) is set to "1" only if the corresponding bits of the SAC bitmap (210) and the process bitmap (220) are both set to "1." For example, as shown in FIG. 2A, the bit for cache color "A" in the SAC bitmap (210) is set to "1," and the bit for cache color "A" in the process bitmap (220) is set to "0." Accordingly, the bit for cache color "A" in the selection bitmap (230) is set to "0." In another example, the bit for cache color "B" in the SAC bitmap (210) and the bit for cache color "B" in the process bitmap (220) are both set to "1." Accordingly, the bit for cache color "B" in the selection bitmap (230) is set to "1." One of skill in the art will appreciate that the above calculations may be performed very efficiently, thereby enabling efficient allocation of memory pages. Further, one of skill in the art will appreciate that a bit set to "1" in the selection bitmap (230) indicates that memory pages of the corresponding cache color are available for allocation, and that the current process has not used that cache color recently.

In one or more embodiments, the selection bitmap (230) may be used to allocate memory pages to a process based on cache color. More specifically, when a process requires a memory page, the cache color of the memory page to be allocated may first be determined by selecting a bit set to "1" from the selection bitmap (230). The allocated memory page may then be selected from available memory pages of the determined cache color. The use of the selection bitmap (230) is described in further detail below with reference to FIG. 4.

One of skill in the art will appreciate that, while the above examples of the logical operation are described in terms of a logical AND operation using particular data structures, embodiments of the invention may use different logical operations (e.g., OR, XOR, NOT, combinations thereof, etc.) and/or different data structures to generate a selection bitmap. For example, a bit set to "0" in the SAC bitmap (210) may indicate that the number of memory pages of a corresponding cache color that are available is above a minimum threshold. In another example, a bit set to "0" in the process bitmap (220) may indicate that memory pages of a particular cache color have not been recently allocated for use by the corresponding process.

FIG. 2B shows data structures used to allocate memory pages to specific objects based on cache color, in accordance with one embodiment of the invention. In particular, FIG. 2B shows, in addition to the SAC bitmap (210) discussed above with reference to FIG. 2A, an object bitmap (240) and a selection bitmap (250). In one or more embodiments, each data object loaded into memory (130) may have a corresponding object bitmap (240). Such data objects may include, e.g., a shared library accessible by multiple processes, metadata used by an operating system, and the like. Similarly to the process bitmap (220) discussed above with reference to FIG. 2A, the object bitmap (240) may also include a bit for each cache color of the cache (e.g., cache colors "A" to "H"). Within a particular object bitmap (240), each bit may indicate whether any memory pages of a cache color have not been recently allocated to store the data object to which the object bitmap (240) corresponds.

Initially, all the bits of the object bitmap (240) may be set to "1." Thereafter, as memory pages of various cache colors are allocated to store the data object, the bits of the object bitmap (240) corresponding to those cache colors may be set to "0." Similarly to the process bitmap (220) discussed above with reference to FIG. 2A, the bits of the object bitmap (240) may be reset to "1" based on a number of bits set to "0," based on a time period, or some other technique.

Referring again to FIG. 2B, the selection bitmap (250) may be generated by performing a logical AND of each bit in the SAC bitmap (210) with a corresponding bit of the object bitmap (240). For example, as shown in FIG. 2B, the bit for cache color "C" in the SAC bitmap (210) is set to "0," and the bit for cache color "C" in the object bitmap (240) is set to "1." Accordingly, the bit for cache color "C" in the selection bitmap (250) is set to "0." In another example, the bit for cache color "D" in the SAC bitmap (210) and the bit for cache color "D" in the object bitmap (240) are both set to "1." Accordingly, the bit for cache color "D" in the selection bitmap (250) is set to "1." One of skill in the art will appreciate that a bit set to "1" in the selection bitmap (250) indicates that memory pages of the corresponding cache color are available for allocation, and that the corresponding data object has not used that cache color recently.

In one or more embodiments, the selection bitmap (250) shown in FIG. 2B may be used to allocate memory pages to store a data object based on cache color. More specifically, when a data object requires a memory page, the cache color of the memory page to be allocated may first be determined by selecting a bit set to "1" from the selection bitmap (250). The allocated memory page may then be selected from available memory pages of the determined cache color. The use of the selection bitmap (250) is described in further detail below with reference to FIG. 3.

Figure 3:
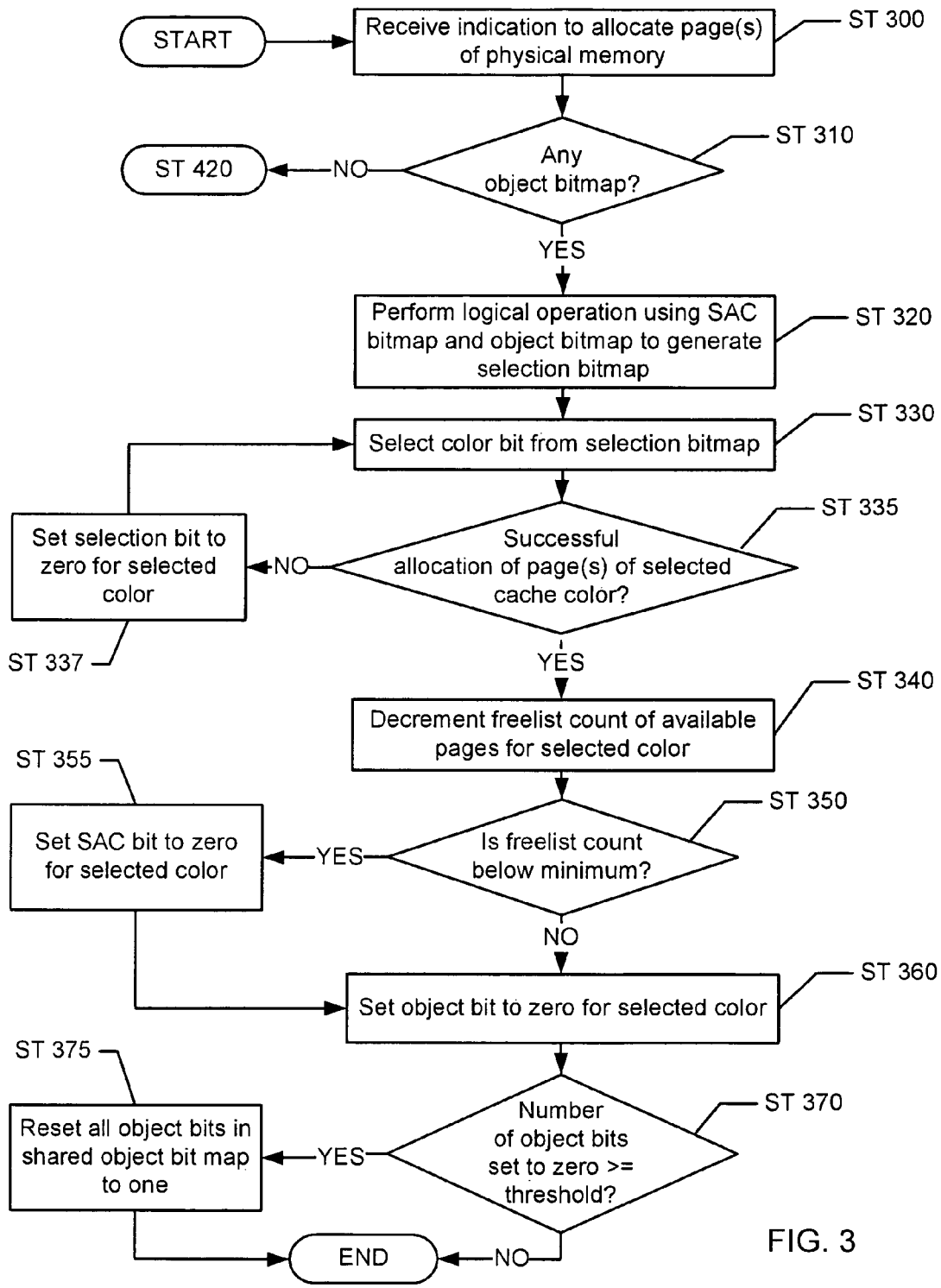
FIG. 3 shows a flow chart for a method for allocating memory pages to a shared object based on cache color, in accordance with one or more embodiments of the invention.

FIG. 3 shows a flow chart for a method for allocating memory pages to store a data object based on cache color, in accordance with one or more embodiments of the invention. In particular, FIG. 3 illustrates a method corresponding to the data structures described above with reference to FIG. 2B. In one or more embodiments of the invention, one or more of the steps described below may be omitted, repeated, performed in parallel, and/or performed in a different order. Accordingly, the specific arrangement of steps shown in FIG. 3 should not be construed as limiting the scope of the invention.

At ST 300, an indication to allocate page(s) of physical memory (e.g., memory (130) shown in FIG. 1A) may be received. For example, a user of a computer may open a software application, thus causing a data object to be loaded in memory. At ST 310, a determination is made about whether the data object for which memory pages are to be allocated has a corresponding object bitmap (e.g., object bitmap (240) shown in FIG. 2B). If the data object does not have an object bitmap, the method continues at ST 420 (discussed below with reference to FIG. 4). However, if the data object has an object bitmap, then at ST 320, a logical operation of a SAC bitmap and the object bitmap may be performed to generate a selection bitmap. For example, as shown in FIG. 2B, the selection bitmap (250) is generated by performing a logical AND of the SAC bitmap (210) and the object bitmap (240).

At ST 330, a cache color may be selected from the bits set to "1" in the selection bitmap (generated at ST 320). For example, referring to the selection bitmap (250) shown in FIG. 2B, the bits corresponding to cache colors "D" and "G" are set to "1." Accordingly, in this example, the cache color is selected from cache colors "D" and "G." In one or more embodiments, if there are multiple bits set to "1" in the selection bitmap (250), one of these multiple bits may be randomly chosen to select a cache color. Alternatively, other techniques may be used to select one of the multiple bits set to "1." At ST 335, a determination is made about whether memory pages of the cache color (selected at ST 330) may be successfully allocated for the data object. If memory pages cannot be successfully allocated, then at ST 337, the bit for the selected color in the selection bitmap may be set to "0," thereby preventing the same color from being selected again. The method then returns to ST 330, where a different cache color may be selected. For example, referring to the selection bitmap (250) shown in FIG. 2B, assume the bit corresponding to cache color "D" is randomly selected. In the event that no memory pages having cache color "D" may be successfully allocated for the data object, then the data object may instead be allocated using memory pages having cache color "G."

However, if it is determined at ST 335 that memory pages of the selected cache color may be successfully allocated for the data object, then at ST 340, a freelist count (i.e., a count of the number of available memory pages of the selected cache color) is decremented by the number of memory pages successfully allocated. In one or more embodiments, the freelist count may be included in one of the data structures shown in FIG. 2B (e.g., in the object bitmap (240)), or may stored in a separate data structure (not shown in FIG. 2B).

At ST 350, a determination is made about whether the freelist count is below a minimum threshold of available pages. If the freelist count is not below the minimum threshold, then the method continues at ST 360 (described below). However, if the freelist count is below the minimum threshold, then at ST 355, the bit of the selected cache color in the SAC bitmap may be set to "0." For example, referring to FIG. 2B, if cache color "D" is selected (at ST 330), and it is determined (at ST 350) that the number of available memory pages having cache color "D" is less than a minimum threshold (e.g., one page, five pages, etc.), then the bit in the SAC bitmap (210) which corresponds to cache color "D" may be set to "0."

After either ST 350 or ST 355, at ST 360, the bit corresponding to the selected cache color in the object bitmap (e.g., object bitmap (240) shown in FIG. 2B) may be set to "0." At ST 370, a determination is made about whether the number of bits in the object bitmap that are set to "0" meets or exceeds some maximum threshold (e.g., all bits, 90% of bits, etc.). If so, then at ST 375, all bits in the object bitmap are reset to "1," thus indicating that all cache colors are considered to not have been used recently for storing the data object. After either ST 370 or ST 375, the method ends.

Figure 4:
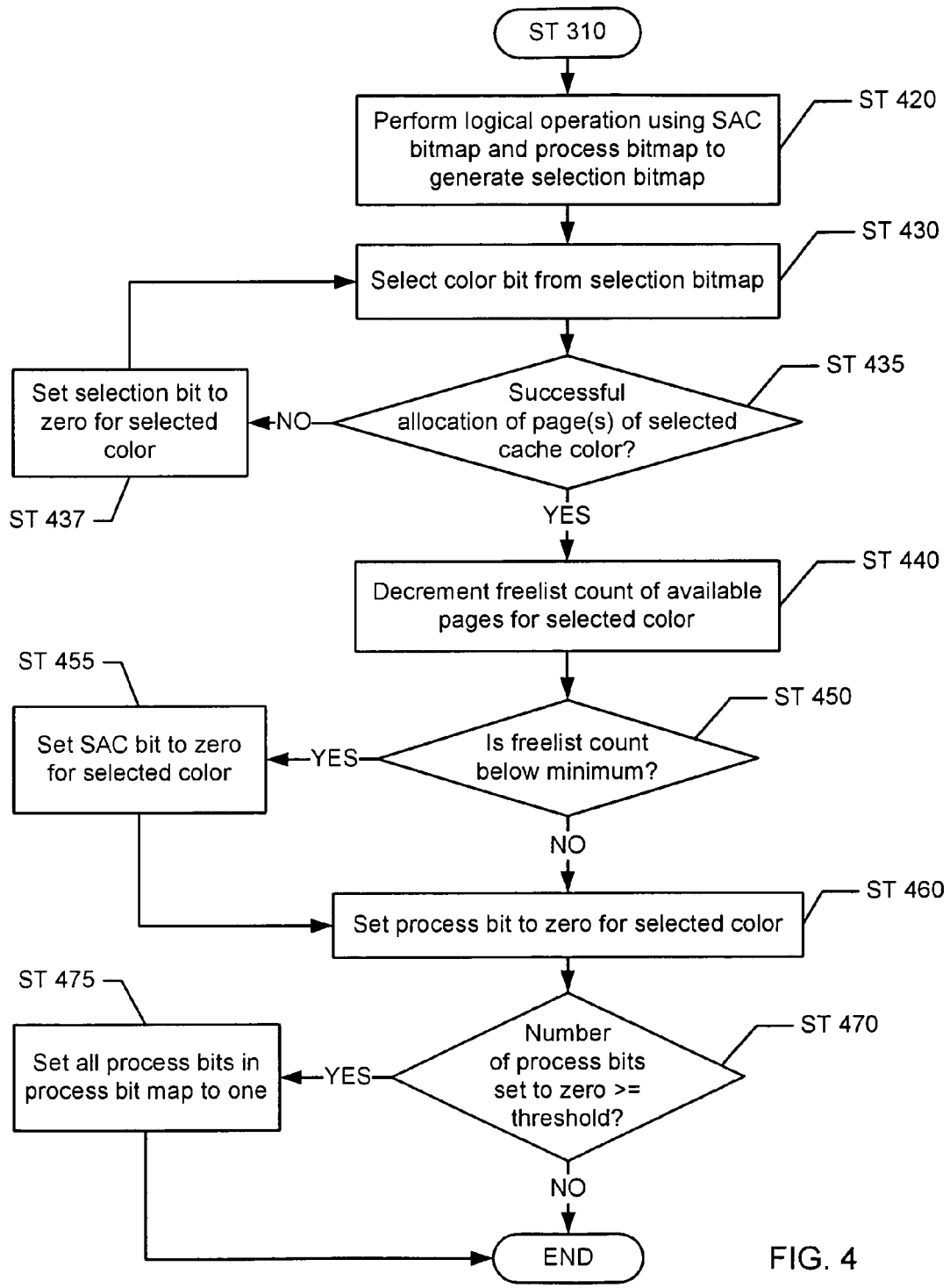
FIG. 4 shows a flow chart for a method for allocating memory pages to a process based on cache color, in accordance with one or more embodiments of the invention.

FIG. 4 shows a flow chart for a method for allocating memory pages for a process based on cache color, in accordance with one or more embodiments of the invention. In particular, FIG. 4 illustrates a method corresponding to the data structures described above with reference to FIG. 2A. Further, the flowchart of FIG. 4 represents a continuation of the flowchart shown in FIG. 3. In one or more embodiments of the invention, one or more of the steps described below may be omitted, repeated, performed in parallel, and/or performed in a different order. Accordingly, the specific arrangement of steps shown in FIG. 4 should not be construed as limiting the scope of the invention.

The flowchart of FIG. 4 begins after ST 310 (shown in FIG. 3), where a determination is made that there is no object bitmap which may be used to allocate memory pages for a data object. At ST 420, a logical operation of a SAC bitmap and a process bitmap may be performed to generate a selection bitmap. For example, as shown in FIG. 2A, the selection bitmap (230) is generated by performing a logical AND of the SAC bitmap (210) and the process bitmap (220).

At ST 430, a cache color may be selected from the bits set to "1" in the selection bitmap (generated at ST 420). For example, referring to the selection bitmap (230) shown in FIG. 2A, the bits corresponding to cache colors "B" and "D" are set to "1." Accordingly, in this example, the cache color is selected from cache colors "B" and "D." In one or more embodiments, if there are multiple bits set to "1" in the selection bitmap (230), one of these multiple bits may be randomly chosen to select a cache color. Alternatively, other techniques may be used to select one of the multiple bits set to "1."

At ST 435, a determination is made about whether memory pages of the cache color (selected at ST 430) may be successfully allocated for the process. If memory pages cannot be successfully allocated, then at ST 437, the bit for the selected color in the selection bitmap may be set to "0," thereby preventing the same color from being selected again. The method then returns to ST 430, where a different cache color may be selected. However, if it is determined at ST 435 that memory pages of the selected cache color may be successfully allocated for the process, then at ST 440, a freelist count for the selected cache color is decremented by the number of memory pages successfully allocated. In one or more embodiments, the freelist count may be included in one of the data structures shown in FIG. 2A (e.g., in the process bitmap (220)), or may stored in a separate data structure (not shown in FIG. 2A).

At ST 450, a determination is made about whether the freelist count is below a minimum threshold of available pages. If the freelist count is not below the minimum threshold, then the method continues at ST 460 (described below). However, if the freelist count is below the minimum threshold, then at ST 455, the bit of the selected cache color in the SAC bitmap may be set to "0." For example, referring to FIG. 2A, if cache color "B" is selected (at ST 430), and it is determined (at ST 450) that the number of available memory pages having cache color "B" is less than a minimum threshold (e.g., one page, five pages, etc.), then the bit in the SAC bitmap (210) which corresponds to cache color "D" may be set to "0."

After either ST 450 or ST 455, at ST 460, the bit corresponding to the selected cache color in the process bitmap (e.g., process bitmap (220) shown in FIG. 2A) may be set to "0." At ST 470, a determination is made about whether the number of bits in the process bitmap that are set to "0" meets or exceeds some maximum threshold (e.g., all bits, 90% of bits, etc.). If so, then at ST 475, all bits in the process bitmap are reset to "1," thus indicating that all cache colors are considered to not have been used recently by the process. After either ST 470 or ST 475, the method ends.

Figure 5:
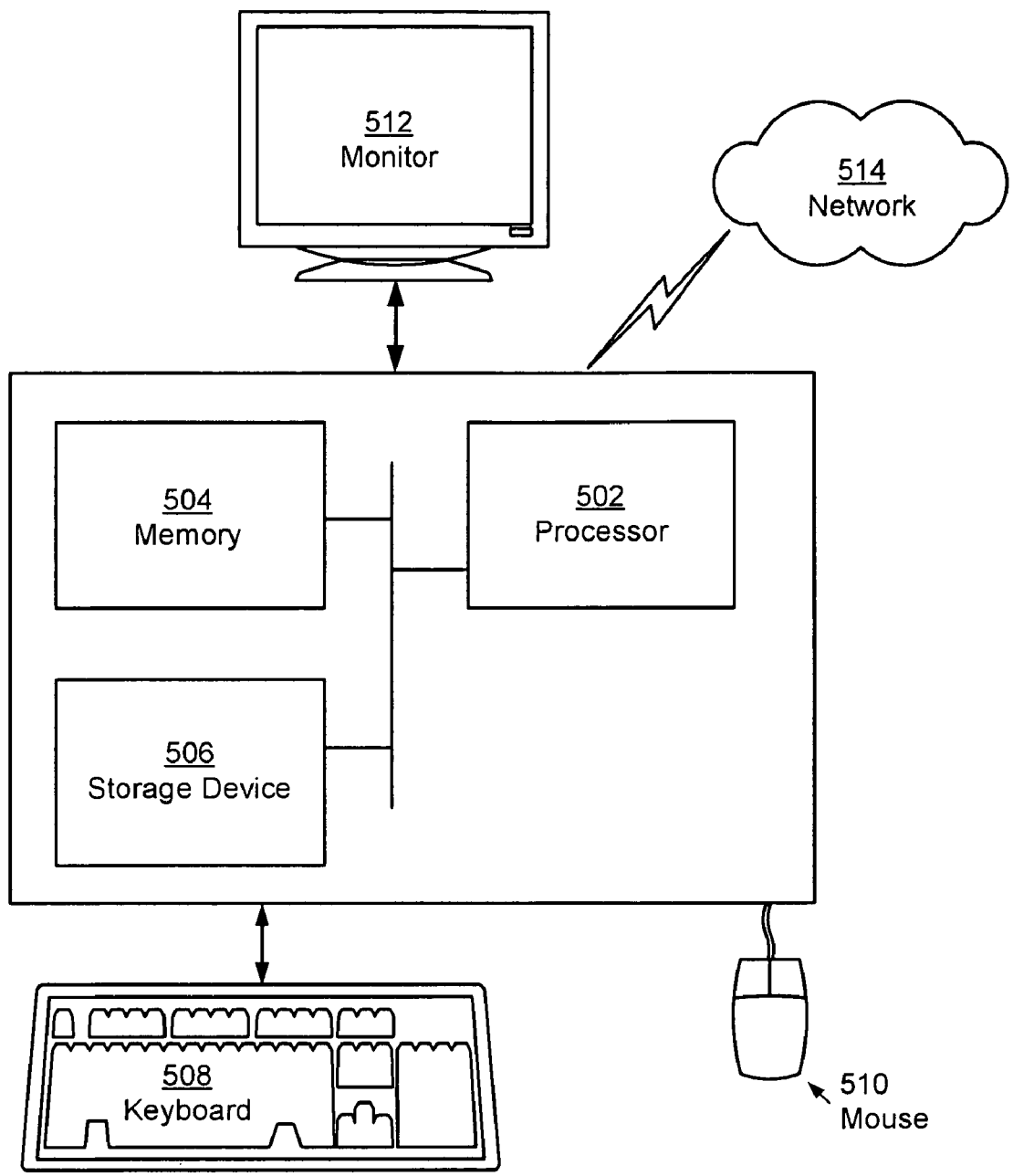
FIG. 5 shows a computer system in accordance with one or more embodiments of the invention.

Embodiments of the invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (600) is connected to a local area network or a wide area network (514) via a network interface connection (not shown). Those skilled in the art will appreciate that these input and output means may take other forms. Further, those skilled in the art will appreciate that one or more elements of the aforementioned computer (500) may be remotely located and connected to the other elements over a network. Further, computer readable program code (i.e., software instructions) to perform embodiments of the invention may be embodied on a computer readable storage medium such as a compact disc (CD), a diskette, a tape, or any other physical computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

The invention claimed is:

1. A method for allocating at least one of a plurality of pages of a physical memory in a computer, comprising:
   receiving an indication of a requirement to allocate the at least one page of the plurality of pages for a process, wherein the plurality of pages are associated with a plurality of cache colors;
   generating, by a processor, a selection bitmap by performing a logical operation of a system available colors bitmap and a process bitmap,
   wherein the system available colors bitmap and the process bitmap each include one bit corresponding to each of the plurality of cache colors,
   wherein each bit of the system available colors bitmap indicates whether a number of pages associated with a corresponding cache color that are available to be allocated is above a minimum threshold, and
   wherein each bit of the process bitmap indicates whether any pages associated with the corresponding cache color have been recently allocated for the process;
   selecting, using the selection bitmap, a cache color of the plurality of cache colors; and
   allocating a page of the plurality of pages for the process, wherein the allocated page is associated with the selected cache color.

2. The method of claim 1,
   wherein each bit of the system available colors bitmap is set to "1" to indicate that the number of pages associated with the corresponding cache color that are available to be allocated is above the minimum threshold,
   wherein each bit of the process bitmap is set to "1" to indicate that any pages associated with the corresponding cache color have not been recently allocated for the process, and
   wherein the logical operation is a logical AND operation.

3. The method of claim 2, wherein each bit of the selection bitmap that is set to "1" indicates that that pages associated with the corresponding cache color are available for allocation, and that pages associated with the corresponding cache color have not been recently allocated for the process, and wherein the logical operation is a logical AND operation.

4. The method of claim 3, wherein selecting the cache color of the plurality of cache colors comprises selecting a bit of the selection bitmap which is set to "1."

5. The method of claim 1, further comprising, prior to allocating the page for the process:
   determining that there is an insufficient number of pages associated with the selected cache color to allocate for the process; and
   in response to the determination:
      selecting, using the selection bitmap, a different cache color of the plurality of cache colors.

6. The method of claim 5, further comprising, prior to selecting a different cache color of the plurality of cache colors:
   setting the bit of the selection bitmap that corresponds to the selected cache color to "0."

7. The method of claim 1, further comprising, after allocating the page of the plurality of pages for the process:
   determining that the number of pages associated with the selected cache color that are available to be allocated is below the minimum threshold, and
   in response to the determination:
      setting the bit of the system available colors bitmap that corresponds to the selected cache color to "0."

8. The method of claim 1, further comprising, after allocating the page of the plurality of pages for the process:
   determining that a number of bits in the process bitmap that are set to "0" is above a maximum threshold; and
   in response to the determination:
      setting all of the bits in the process bitmap to "1."

9. A non-transitory computer readable storage medium having computer readable program code embodied therein, the computer readable program code adapted to, when executed by a processor, implement a method for allocating at least one of a plurality of pages of a physical memory, the method comprising:

receiving an indication of a requirement to allocate the at least one page of the plurality of pages to store a data object, wherein the plurality of pages are associated with a plurality of cache colors;

generating a selection bitmap by performing a logical operation of a system available colors bitmap and an object bitmap,
  wherein the system available colors bitmap and the object bitmap each include one bit corresponding to each of the plurality of cache colors,
  wherein each bit of the system available colors bitmap indicates whether a number of pages associated with a corresponding cache color that are available to be allocated is above a minimum threshold, and
  wherein each bit of the object bitmap indicates whether any pages associated with the corresponding cache color have been recently allocated to store the data object;

selecting, using the selection bitmap, a cache color of the plurality of cache colors; and allocating a page of the plurality of pages to store the data object, wherein the allocated page is associated with the selected cache color.

10. The computer readable storage medium of claim 9, wherein each bit of the system available colors bitmap is set to "1" to indicate that the number of pages associated with the corresponding cache color that are available to be allocated is above the minimum threshold,
  wherein each bit of the object bitmap is set to "1" to indicate that any pages associated with the corresponding cache color have not been recently allocated to store the data object, and
  wherein the logical operation is a logical AND operation.

11. The computer readable storage medium of claim 10, wherein each bit of the selection bitmap that is set to "1" indicates that that pages associated with the corresponding cache color are available for allocation, and that pages associated with the corresponding cache color have not been recently allocated to store the data object.

12. The computer readable storage medium of claim 11, wherein selecting the cache color of the plurality of cache colors comprises selecting a bit of the selection bitmap which is set to "1."

13. The computer readable storage medium of claim 9, the method further comprising, prior to allocating the page to store the data object:
  determining that there is an insufficient number of pages associated with the selected cache color to allocate to store the shared object; and
  in response to the determination:
    selecting, using the selection bitmap, a different cache color of the plurality of cache colors.

14. The computer readable storage medium of claim 13, further comprising, prior to selecting a different cache color of the plurality of cache colors:
  setting the bit of the selection bitmap that corresponds to the selected cache color to "0."

15. The computer readable storage medium of claim 9, the method further comprising, after allocating the page of the plurality of pages to store the shared object:
  determining that the number of pages associated with the selected cache color that are available to be allocated is below the minimum threshold, and
  in response to the determination:
    setting the bit of the system available colors bitmap that corresponds to the selected cache color to "0."

16. The computer readable storage medium of claim 9, the method further comprising, after allocating the page of the plurality of pages to store the shared object:
  determining that a number of bits in the object bitmap that are set to "0" is above a maximum threshold; and
  in response to the determination:
    setting all of the bits in the object bitmap to "1."

17. A system, comprising:
a processor;
a physical memory; and
a computer readable storage medium having computer readable program code embodied therein, the computer readable program code adapted to, when executed by the processor, implement a method for allocating at least one of a plurality of pages of the physical memory, the method comprising:
  receiving an indication of a requirement to allocate the at least one page of the plurality of pages to store a data object required by a process, wherein the plurality of pages are associated with a plurality of cache colors;
  determining whether an object bitmap corresponding to the data object exists; and
  upon determining that the object bitmap corresponding to the data object exists:
    generating a selection bitmap by performing a logical operation of a system available colors bitmap and the object bitmap,
      wherein the system available colors bitmap and the object bitmap each include one bit corresponding to each of the plurality of cache colors,
      wherein each bit of the system available colors bitmap indicates whether a number of pages associated with a corresponding cache color that are available to be allocated is above a minimum threshold, and
      wherein each bit of the object bitmap indicates whether any pages associated with the corresponding cache color have been recently allocated to store the data object;
    selecting, using the selection bitmap, a cache color of the plurality of cache colors; and
    allocating a page of the plurality of pages to store the data object, wherein the allocated page is associated with the selected cache color.

18. The system of claim 17,
wherein each bit of the system available colors bitmap is set to "1" to indicate that the number of pages associated with the corresponding cache color that are available to be allocated is above the minimum threshold, and
wherein each bit of the object bitmap is set to "1" to indicate that any pages associated with the corresponding cache color have not been recently allocated to store the data object.

19. The system of claim 17, wherein the logical operation is a logical AND operation.

20. The system of claim 17, wherein when the object bitmap corresponding to the data object does not exist:
  generating the selection bitmap by performing a logical operation of the system available colors bitmap and a process bitmap,
    wherein the system available colors bitmap and the process bitmap each include one bit corresponding to each of the plurality of cache colors,
    wherein each bit of the system available colors bitmap indicates whether the number of pages associated with the corresponding cache color that are available to be allocated is above the minimum threshold, and wherein each bit of the process bitmap indicates whether any pages associated with the corresponding cache color have been recently allocated for the process;

selecting, using the selection bitmap, the cache color of the plurality of cache colors; and allocating the page of the plurality of pages for the process, wherein the allocated page is associated with the selected cache color.

\* \* \* \* \*